United States Patent
Hulsebos et al.

(10) Patent No.: US 9,816,648 B2
(45) Date of Patent: Nov. 14, 2017

(54) COUPLING DEVICE FOR A TUBE

(71) Applicant: Georg Fischer WAGA N.V., Epe (NL)

(72) Inventors: Michel Paul Hulsebos, Holten (NL);
Jeroen Hermanus Johannes Wijlens, Haaksbergen (NL); Leonardus Henricus Wilhelmus Giesen, Enschede (NL)

(73) Assignee: Georg Fischer WAGA N.V. (NL)

( * ) Notice: Subject to any disclaimer, the term of this patent is extended or adjusted under 35 U.S.C. 154(b) by 154 days.

(21) Appl. No.: 14/648,875

(22) PCT Filed: Dec. 5, 2013

(86) PCT No.: PCT/EP2013/075597
§ 371 (c)(1),
(2) Date: Jun. 1, 2015

(87) PCT Pub. No.: WO2014/090667
PCT Pub. Date: Jun. 19, 2014

(65) Prior Publication Data
US 2015/0308594 A1 Oct. 29, 2015

(30) Foreign Application Priority Data

Dec. 10, 2012 (NL) .................................. 2009953

(51) Int. Cl.
*F16L 17/00* (2006.01)
*F16L 21/04* (2006.01)
*F16L 21/08* (2006.01)

(52) U.S. Cl.
CPC ............... *F16L 21/04* (2013.01); *F16L 21/08* (2013.01)

(58) Field of Classification Search
USPC ........ 285/108, 113, 339, 341, 342, 368, 421
See application file for complete search history.

(56) References Cited

U.S. PATENT DOCUMENTS 6,257,628 B1 * 7/2001 Nijsen ..................... F16L 21/04
285/322
7,354,073 B2 * 4/2008 Sakamoto ............... F16L 21/04
285/104
(Continued)

FOREIGN PATENT DOCUMENTS

| EP | 2090815 A2 | 8/2009 |
| WO | WO-2007-055576 A1 | 5/2007 |
| WO | WO-2010-114366 A2 | 10/2010 |

OTHER PUBLICATIONS

International Search Report (in English) for PCT/EP2013/075597, dated Jan. 28, 2014; ISA/EP.

*Primary Examiner* — Aaron Dunwoody
(74) *Attorney, Agent, or Firm* — Harness, Dickey & Pierce, P.L.C.

(57) ABSTRACT

The invention relates to a coupling device for coupling with a tube, comprising at least one pressure element for exerting a clamping force on the tube, wherein the said at least one pressure element is one of a series of correspondingly embodied neighboring pressure elements, wherein each pressure element of said series comprises a first pressure element segment and a second pressure element segment, and wherein the first pressure element segment is placed proximally and the second pressure element segment distally with respect to the tube, and that of each pressure element the first pressure element segment is provided with a protrusion extending transversely to the longitudinal direction of the tube, and that said protrusion extends into a slot that is provided in a directly neighboring second pressure element segment that forms part of a neighboring pressure element.

6 Claims, 3 Drawing Sheets

(56) References Cited

U.S. PATENT DOCUMENTS

| | | | |
|---|---|---|---|
| 7,789,431 B2* | 9/2010 | Freudendahl | F16L 21/04 285/104 |
| 8,505,985 B2* | 8/2013 | Nijsen | F16L 21/04 285/323 |
| 9,334,990 B2* | 5/2016 | Nijsen | F16L 21/04 |
| 2003/0085566 A1* | 5/2003 | Rex | F16L 21/04 285/104 |
| 2011/0148105 A1* | 6/2011 | Nijsen | F16L 21/04 285/339 |

* cited by examiner

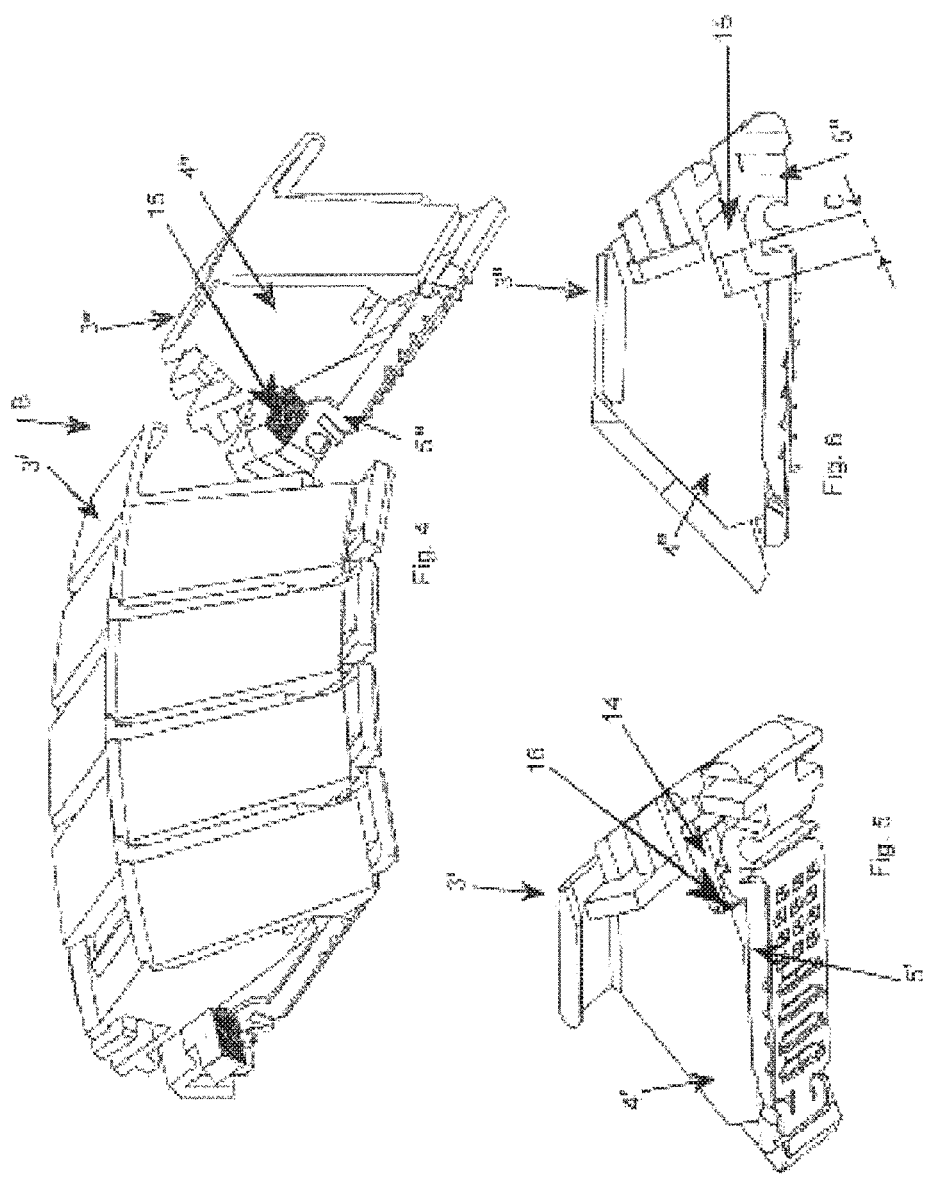

US 9,816,648 B2

COUPLING DEVICE FOR A TUBE

CROSS-REFERENCE TO RELATED APPLICATIONS

This application is a 371 National Stage of International Application No. PCT/EP2013/075597, filed on Dec. 5, 2013, and published in English as WO 2014/090667 A1 on Jun. 19, 2014. This application claims the benefit and priority of The Netherlands Application No. 2009953, filed on Dec. 10, 2012. The entire disclosures of the above applications are incorporated herein by reference.

BACKGROUND

This section provides background information related to the present disclosure which is not necessarily prior art.

TECHNICAL FIELD

The present invention relates to a coupling device for coupling with a tube, comprising at least one pressure element for exerting a clamping force on the tube, wherein the said at least one pressure element is one of a series of correspondingly embodied neighboring pressure elements, wherein each pressure element of said series comprises a first pressure element segment and a second pressure element segment, and wherein the first pressure element segment is placed proximally and the second pressure element segment is placed distally with respect to the tube.

DISCUSSION

Such a coupling device is disclosed in WO2007/055576.
WO2007/055576 relates to a coupling device for coupling with a tube, comprising at least one pressure element for exerting a clamping force on the tube, wherein the at least one pressure element is provided with at least one sealing organ wherein, at the side facing away from the tube, the said at least one pressure element is embodied with surfaces that converge towards each other in a radial orientation away from the tube, and that further support elements are provided that can be coupled to each other and are designed to be placed directly or indirectly against said surfaces of the at least one pressure element, so as to provide the clamping force on the tube. The coupling device of WO2007/055576 is embodied with contact surfaces with an incline which is designed such that during tension strain between the coupling and the tube, the first pressure element segment is caused to clamp the tube more tightly and furthermore, that the tension strain between the coupling and the tube endows the second pressure element segment with an increased force on the support elements.

The construction of the coupling device according to WO2007/055576 makes it possible that during tension strain between the coupling and the tube the sealing action of the sealing organ improves. Due to the increased clamping force exerted by the pressure element on the tube an improved sealing action on said tube is provided and also the sealing action of the sealing organ between the pressure element and the support elements will improve.

According to WO2007/055576 it is desirable that the first pressure element segment is provided with a projection at an extremity of the inclined surface of the first pressure element segment that is closest to the tube, and which limits the movement of the second pressure element segment. This projection is said to be particularly useful for increasing the force that the co-operating support walls exert on the at least one pressure element. Due to the inclining contact surfaces of the separate pressure element segments, the absence of this projection could mean that the mutual positioning of these pressure element segments cannot be guaranteed.

A remaining problem with the known coupling device is the trade-off that exists between the angle of the inclination between the contacting surfaces of the first pressure element segment and the second pressure element segment on the one hand, and on the other hand the capability of the known coupling device to resist loss of operationability of the coupling device when heavy tension strains are applied to the tube, and at the same time to increase the effectiveness of the sealing action in that heavy tension strain situation. Generally speaking the effectiveness of the sealing action can be improved by arranging that there is a relatively small angle of inclination of said contacting surfaces. Conversely the effectiveness of the sealing action decreases when the angle of inclination becomes too large. A relatively small angle of inclination of said contacting surface enlarges however the danger that when heavy tension strains exist between the tube and the coupling device, the first pressure element segment initially enlarges the pressure exerted on the tube, yet with further increased tension strain will contract the tube and/or slip away from underneath the second pressure element segment, causing that the coupling with the tube is entirely lost.

SUMMARY OF THE DISCLOSURE

For a further improvement of the effectiveness of the coupling device according to the invention it is therefore proposed that of each pressure element the first pressure element segment is provided with a projection extending transversely to the longitudinal direction of the tube, and that said projection extends into a slit or slot that is provided in a directly neighboring second pressure element segment that forms part of a neighboring pressure element. This projection extending transversely to the longitudinal direction of the tube does not impact the assembly of the coupling device, which is done by making a complete ring of pressure elements that are of same shape and dimension, and this is irrespective whether or not the pressure elements are also embodied with the above-mentioned first projection at the extremity of the inclined contacting surfaces closest to the tube, which is provided on the first pressure element segment to limit the movement of the second pressure element segment.

Consistent with the above and in accordance with the invention an embodiment of the coupling device has the feature that the at least one pressure element is one of a series of correspondingly embodied neighboring pressure elements, wherein each pressure element of said series comprises a first pressure element segment and a second pressure element segment, wherein the first pressure element segment is placed proximally and the second pressure element segment is placed distally with respect to the tube, and that of each pressure element the first pressure element segment is provided with a projection extending transversely to the longitudinal direction of the tube, and that said projection extends into a slot that is provided in a directly neighboring second pressure element segment that forms part of a neighboring pressure element.

Suitably a side wall of the slot provides a stop limiting the extension of the projection extending in said slot, so as to cause that longitudinal movement of the first pressure element segment and the second pressure element segment of any pressure element with respect to each other is limited. In this way the angle of inclination of the contacting surfaces of the first pressure element segment and the second element segment can be relatively small which is beneficial for effective sealing, without the danger that the functionality of the coupling device of the invention is lost when heavy tension strains are present between the tube and the coupling device.

The invention is also embodied in the loose pressure elements for use in a coupling device as explained above. The said loose pressure element of the invention is one of a series of correspondingly embodied pressure elements, wherein each pressure element of said series comprises a first pressure element segment and a second pressure element segment, and wherein in use the first pressure element segment is placed proximally and the second pressure element segment is placed distally with respect to the tube. According to the invention in each pressure element the first pressure element segment is provided with a projection that in use extends transversely to the longitudinal direction of the tube, and this projection is arranged to extend into a slot that is provided in a second pressure element segment that forms part of an adjoining pressure element.

Correspondingly the invention also covers an embodiment in which the slot in the adjoining pressure element provides a stop limiting the extension of the projection extending in said slot, so as to cause that longitudinal movement of the first pressure element segment and the second pressure element segment of the adjoining pressure elements with respect to each other is limited.

Hereinafter the invention will be further elucidated by way of a number of exemplary embodiments of the coupling device according to the invention and with reference to the drawings, without limiting the patent claims.

BRIEF DESCRIPTION OF THE DRAWINGS

The drawings described herein are for illustrative purposes only of selected embodiments and not all possible implementations, and are not intended to limit the scope of the present disclosure.

The drawing shows in:

FIG. 4 shows part of a ring of neighboring pressure elements;

FIG. 5 shows a first side view of a pressure element in accordance with the invention; and FIG. 6 shows the second side view opposite to the first side view of the pressure element of the invention.

DETAILED DESCRIPTION OF THE PREFERRED EMBODIMENTS

Figure 1:
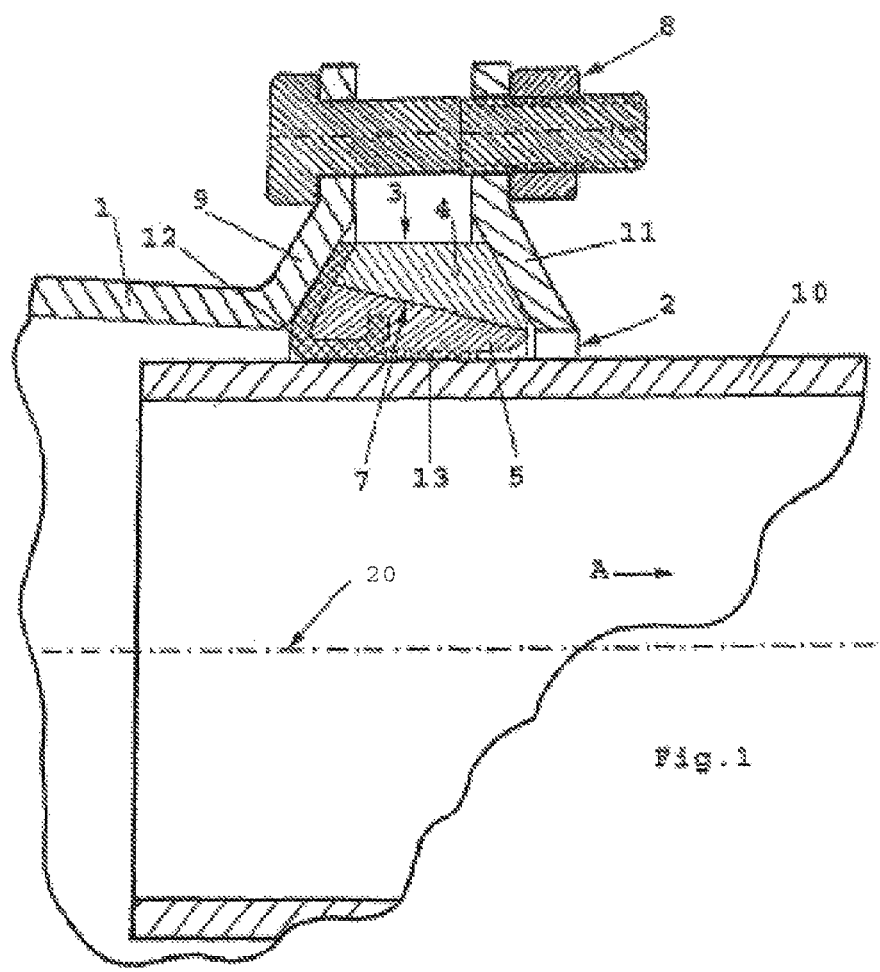
FIG. 1 is a schematic drawing of a coupling device with features common to the coupling device according to the invention.

Example embodiments will now be described more fully with reference to the accompanying drawings.

Whenever in the figures the same reference numerals are applied, these numerals refer to the same or similar parts.

Referring first to FIG. 1 some aspects of the coupling device according to the invention will now be elucidated that the coupling device shares with the coupling device of the prior art.

The coupling device shown in FIG. 1 comprises a sleeve part 1 with an insert end 2 for the tube 10 having a longitudinal axis 20 and at least one pressure element 3 for exerting a clamping force on the tube 10. The pressure element 3 co-operates with a sealing organ 12, usually an element made of rubber, providing the actual seal around the tube 10.

At the side facing away from the tube, the at least one pressure element 3 is further provided with surfaces that converge in the radial direction, whose orientation corresponds to the orientation of the support walls 9 and 11. The converging surfaces of the pressure element 3 may be flat, concave or convex.

The above-mentioned support walls 9 and 11 can be mutually coupled by means of bolt and nut element 8, such that when this bolt and nut element 8 is tightened, the support walls 9 and 11 clampingly press the at least one pressure element 3 onto the tube 10.

FIG. 1 shows that the at least one pressure element 3 is embodied with a first pressure element segment 5 and a second pressure element segment 4, wherein the first pressure element segment 5 is proximally, and the second pressure element segment 4 is distally positioned with respect to the tube 10. The first and the second pressure element segments 4, 5 are provided with co-operating contact surfaces 7 placed to abut to each other, which have a predetermined incline in respect to the longitudinal axis 14 of the tube 10. FIG. 1 shows that the incline of the contact surfaces 7 is designed such that when the tube 10 is under tension strain in the direction of arrow A, the first pressure element segment 5 is caused to clamp the tube 10 more tightly. The incline of the contact surfaces 7 is further designed such that when the tube 10 is under said tension strain in the direction of arrow A, the second pressure element segment 4 exerts an increased force on the support walls 9 and 11.

As already mentioned above, the sealing organ 12 is preferably embodied as rubber sealing element placed at least partly between a support wall 9 and the segmented pressure element 3 on the one side, and the tube 10 and the segmented pressure element 3 on the other side.

Figure 2:
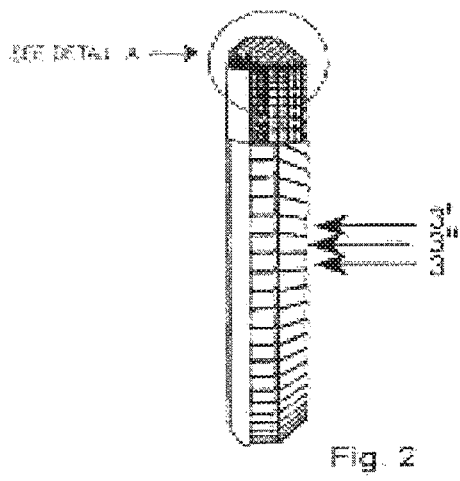
FIG. 2 is a side view of the coupling device of the invention embodied with a series of neighboring pressure elements together forming a complete ring to be placed around the tube.

FIG. 1 does not show the option that the first pressure element segment 5 possesses a projection limiting the movement of the second pressure element segment 4, but this construction is known from FIG. 2 of WO2007/055576, which document is deemed fully inserted and incorporated herein.

FIG. 1 does show that the first pressure element segment 5 is provided with a friction-increasing surface 13 at the side facing towards the tube 10. The friction-increasing surface 13 may be embodied as inlay or alternatively this friction-increasing surface 13 may form an integral part of the first pressure element segment 5.

Figure 3:
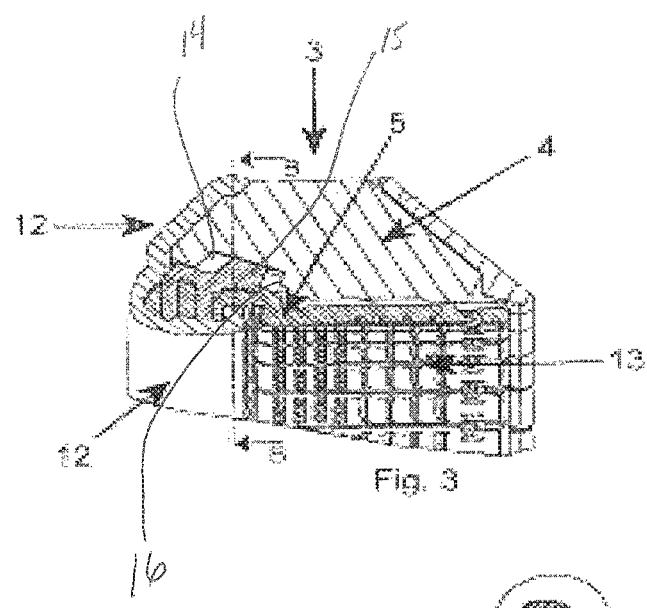
FIG. 3 shows detail A of FIG. 2.

Within the frame of the invention the construction of the coupling device may further be varied in several ways without departing from the spirit of the invention as specified in the appended claims. Essential to the invention is that the at least one pressure element is one of a series of correspondingly embodied neighboring pressure elements 3, 3', 3". This is shown in FIG. 2. FIG. 3 shows detail A of FIG. 2, which shows with reference to the only visible pressure element 3 that each pressure element of said series comprises a first pressure element segment 5 and a second pressure element segment 4, wherein the first pressure element segment 5 is to be placed proximally and the second pressure element segment 4 is to be placed distally with respect to a tube. Accordingly the first pressure element 5 is provided with a friction increasing surface 13. This FIG. 3 also clearly shows that the pressure element 3 is provided with a rubber sealing element 12.

For clarity purposes FIG. 4 shows a part of the ring or annular member formed a series of pressure elements in an isometric view, wherein at arrow B a connection between neighboring elements 3' and 3" still has to be completed. The annular member also has a longitudinal axis 20. This incompleted connection provides the opportunity to view at the feature of the invention that of each pressure element, as is shown with reference to pressure element 3", the first pressure element segment 5" is provided with a projection 15 that extends transversely to the longitudinal direction of the tube to which the coupling device is intended to be mounted. FIG. 6 provides a corresponding side view of this pressure element 3" which is embodied with a first pressure element segment 5" and a second pressure element segment 4", and in which the sideways extending projection 15 of the first pressure element segment 5" is clearly visible.

The projection 15 of the first pressure element segment 5" as shown in FIG. 6 cooperates with a slot 14 in a neighboring pressure element 3' as shown in FIG. 5. FIG. 5 provides a view at the side of the pressure element 3' that lies adjacent to the pressure element 3" of FIG. 6, and shows that the slot 14 is provided in the second pressure element segment 4' that forms part of this neighboring pressure element 3' of FIG. 5. The said projection 15 of the pressure element 3" shown in FIG. 6 thus extends into the slot 14 of the pressure element 3' shown in FIG. 6. A side wall of the slot 14 provides a stop 16 limiting the extension of the projection 15 extending in said slot 14, so as to cause that longitudinal movement of the first pressure element segment 5" and the second pressure element segment 4' of any neighboring pressure elements 3', 3" with respect to each other is limited. In FIG. 6 arrow C indicates the maximum stroke that is available for projection 15 when excursing along slot 14. Additional reference to FIG. 3 shows the relationship between projection 15, slot 14 and the side wall of the slot 14 that provides the stop 16 for projection 15.

The above given explanation with reference to the coupling device according to the invention is to be understood as non-limiting with regard to the protective scope due the invention as specified in the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A coupling device for coupling with a tube, said coupling device comprising:
    a series of pressure elements connected together to form an annular member having a central axis;
    each pressure element having a first segment and a second segment,
    the first segment being proximate to the axis,
    the second segment being distally located relative to the axis,
    the first segment having a projection extending transversely to the axis,
    the second segment having a slot therein presenting a stop surface, and
    the projection in the first segment of each pressure element extending into the slot in the second segment in a neighboring pressure element.

2. The coupling device according to claim 1, wherein the stop surface in the slot limits movement of the projection in said slot, wherein longitudinal movement of the first pressure element segment and the second pressure element segment of neighboring pressure elements with respect to each other is limited.

3. A coupling device for coupling with a tube, said coupling device comprising:
    a series of pressure elements connected together to form an annular member having a central axis;
    each pressure element having a first segment and a second segment,
    the first segment being proximate to the axis,
    the second segment being distally located relative to the axis,
    the first segment having a projection extending transversely to the axis,
    the second segment having a slot therein presenting a stop surface,
    the projection in the first segment of each pressure element extending into the slot in the second segment in a neighboring pressure element;
    a sealing element for each pressure element;
    adjacent support walls that converge and slope away from the axis to form a cavity for receiving the pressure elements;
    the first and second segments having inclined and abutting contact surfaces;
wherein the incline of the contact surfaces causes the first pressure element segment to clamp the tube more tightly during tension strain between the coupling device and the tube, and wherein the second pressure element segment provides an increased force on the support elements.

4. The coupling device according to claim 3, wherein the stop in the slot limits movement of the projection in said slot, wherein longitudinal movement of the first pressure element segment and the second pressure element segment of a neighboring pressure element with respect to each other is limited.

5. A pressure element for use in a coupling device for exerting a clamping force on a tube, wherein the said pressure element is one of a series of correspondingly embodied pressure elements connected together to form an annular member having a central axis; each pressure element of said series comprising:
    a first segment and a second segment,
    the first segment being proximate to the axis,
    the second segment being distally located relative to the axis,
    the first segment having a projection extending transversely to the axis,
    the second segment having a slot therein presenting a stop surface, and
wherein the projection in the first segment of each pressure element is configured to extend into the slot in the second segment in a neighboring pressure element.

6. The pressure element according to claim 5, wherein the stop surface in a neighboring pressure element limits movement of the projection in said slot, wherein longitudinal movement of the first pressure element segment and the second pressure element segment of the neighboring pressure element with respect to each other is limited.

\* \* \* \* \*